United States Patent [19]

Yamada et al.

[11] 4,211,667
[45] Jul. 8, 1980

[54] PROCESS FOR PRODUCING ALUMINA SOLS

[75] Inventors: Koichi Yamada; Masao Yoshihara; Takahiro Ishida, all of Niihama; Kazuo Sato, Nara, all of Japan

[73] Assignee: Sumitomo Aluminium Smelting Company, Limited, Osaka, Japan

[21] Appl. No.: 882,889

[22] Filed: Mar. 1, 1978

[30] Foreign Application Priority Data

Mar. 2, 1977 [JP] Japan ................. 52/23183

[51] Int. Cl.$^2$ ............................................. B01J 13/00
[52] U.S. Cl. .............................. 252/313 R; 106/286.5; 252/317; 423/626
[58] Field of Search ................... 252/313 R; 106/286.5

[56] References Cited

U.S. PATENT DOCUMENTS

| 2,915,475 | 12/1959 | Bugosh | 252/313 R |
| 3,031,417 | 4/1962 | Bruce | 252/313 R |
| 3,031,418 | 4/1962 | Bugosh | 252/313 R |

FOREIGN PATENT DOCUMENTS

| 40-8409 | 4/1965 | Japan | 252/313 R |
| 40-14292 | 7/1965 | Japan | 252/313 R |
| 1440194 | 6/1976 | United Kingdom | 252/313 R |

*Primary Examiner*—Richard D. Lovering
*Attorney, Agent, or Firm*—Wenderoth, Lind & Ponack

[57] ABSTRACT

A process for producing alumina sols characterized by neutralizing a water-soluble basic aluminium salt of the formula,

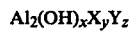

$$Al_2(OH)_xX_yY_z$$

wherein X is Cl or $NO_3$, Y is $SO_4$, and x, y and z are numbers satisfying the equations, $x+y+2z=6$, $0<x<6$, $0\leq y<6$, $0\leq 2z<6$, provided that y and z are not zero at the same time, with an alkali to produce alumina gels, and the subjecting said alumina gels to a hydrothermal treatment in the presence of a monovalent organic acid of such an amount that the molar ratio of the organic acid to aluminium is from 0.001 to 0.15.

The alumina sols of the present invention are low in viscosity, high in $Al_2O_3$ content and are extremely superior in stability with the lapse of time, and produce alumina powders superior in re-dispersibility.

7 Claims, No Drawings

PROCESS FOR PRODUCING ALUMINA SOLS

The present invention relates to a process for producing alumina sols.

More particularly, the present invention relates to a process for producing alumina sols having a low viscosity and a high stability with the lapse of time, and also for producing alumina sols capable of yielding alumina powders which are superior in re-dispersibility.

At present, there are placed on the market various kinds of alumina sol and dispersible alumina powder which is produced by drying said alumina sol and is intended for use in a re-dispersed state. But, these commercial products are markedly low in stability with the lapse of time when they are converted to sols having an $Al_2O_3$ concentration of about 10% by weight or more, and thus gelation occurs within a few days. On the other hand, the sols having a low $Al_2O_3$ concentration have the disadvantage that a large quantity of medium should be transported or a large quantity of medium should be evaporated in practical use.

Alumina sols are generally produced by peptization of the dispersion liquor of alumina gels with an inorganic or organic acid.

Heretofore, the following processes have been proposed to produce alumina sols: (1) a process comprising subjecting the dispersion liquor of alumina gels to a hydrothermal treatment in the presence of an acid of such an amount that the molar ratio of acid radical to aluminium is from 0.5 to 2.4, thereby producing alumina sols consisting of fiber-like alumina particles having a boehmite type crystal lattice (Japanese Patent Publication No. 14292/1965); (2) a process comprising reacting an aqueous sodium aluminate solution with a water-soluble aluminium salt solution in a short time at a pH of 9 to 10, ageing the resulting alumina gel, and adding a monovalent inorganic or organic acid to the dispersion liquor of the alumina gel in such an amount that the molar ratio of acid radical to aluminium is 0.15 or more, thereby producing a uniform sol (Japanese Patent Publication No. 8409/1965); and (3) a process comprising blowing carbon dioxide gas into a sodium aluminate solution and dispersing the resulting pseudo-boehmite in a monovalent strong acid of such an amount that the molar ratio of acid radical to aluminium is from 0.05 to 0.2 (British Pat. No. 1,440,194).

In the process (1), however, only low concentration alumina sol can be obtained. When the slurry with an $Al_2O_3$ concentration of about 10% by weight or more is hydrothermally treated, uniform alumina sol can not be formed due to occurrence of gelation. This gelation seems to occur probably due to the formation of fiber-like alumina particles. Further, in preparing a liquid sol by dispersing the dispersible alumina powder produced by this process in water, the powder is so poor in dispersibility that the sol can not be obtained efficiently, even though the $Al_2O_3$ concentration of the sol is as low as about 10% by weight or less. Furthermore, as to the amount of the acid used in the sol formation, it is only disclosed that the molar ratio of acid radical to aluminium is within the range of from 0.5 to 2.4.

The powder for alumina sol produced by the process (2) is likewise poor in re-dispersibility so that it enables only the preparation of alumina sols having an $Al_2O_3$ concentration of up to about 10% by weight. Besides, the produced alumina sols are also markedly poor in stability with the lapse of time. Further, said Japanese Patent Publication No. 8409/1965 discloses that the alumina gel produced by said process does not change into a sol form when the molar ratio of acid radical to aluminium is less than 0.15.

The alumina sol produced by the process (3) is stable only for a few days, when it has an $Al_2O_3$ concentration of about 10% by weight or more. Further, said British patent discloses that the alumina gel produced by said process can not be converted to sols with an organic acid.

As described above, none of the well-known processes can produce alumina sols which are superior in stability with the lapse of time at high $Al_2O_3$ concentrations, or alumina sols which give alumina powders superior in re-dispersibility. Under the situation as described above, the present inventors extensively studied to produce alumina sols which are remarkably superior in stability with the lapse of time, and alumina sols which give alumina powders superior in re-dispersibility. As a result, it has been found that the foregoing objects can be achieved by treating alumina gels produced from a specified type aluminium salt in the presence of a certain type of organic acid within a definite molar ratio range of acid radical to aluminum.

According to the present invention, there is provided a process for producing alumina sols having a low viscosity and a high stability with the lapse of time, and alumina sols capable of yielding alumina powders which are superior in re-dispersibility, which comprises neutralizing a water-soluble basic aluminium salt of the formula, $$Al_2(OH)_x X_y Y_z$$

wherein X is Cl or $NO_3$, Y is $SO_4$, and x, y and z are numbers satisfying the equations, $x+y+2z=6$, $0 < x < 6$, $0 \leq y < 6$, $0 \leq 2z < 6$, provided that y and z are not zero at the same time, with an alkali, thereby producing alumina gels, and then subjecting said alumina gels to a hydrothermal treatment in the presence of a monovalent organic acid at a molar ratio of the organic acid to aluminium of from 0.001 to 0.15.

In practicing the process of the present invention, alumina used as a starting material is alumina gels produced by neutralizing a water-soluble basic aluminium salt of the formula, $$Al_2(OH)_x X_y Y_z$$

wherein X, Y, x, y and z are as defined above, and x preferably satisfies the equation, $1 < x < 5$, with an alkali.

As examples of the water-soluble basic aluminium salt, there may be given basic aluminium chloride, basic aluminium nitrate and basic aluminium sulfate. Among them, basic aluminium chloride is particularly preferred.

When the alumina gel as a raw material for alumina sols is produced from aluminium salts other than the foregoing water-soluble basic aluminium salts, alumina sols having a high stability with the lapse of time can not be produced in the presence of the organic acid used in the present invention. As examples of the alkali, carbonates (e.g. ammonium carbonate, sodium carbonate), bicarbonates (e.g. sodium hydrogen carbonate, ammonium hydrogen carbonate) and aluminates (e.g. sodium aluminate) are preferably used. But, other alkalis such as ammonium hydroxide and sodium hydroxide may also be used.

Gel-formation reaction between the water-soluble basic aluminium salt represented by the foregoing formula and the alkali is generally carried out at a temperature of 100° C. or lower, preferably at a temperature of about 15° C. to about 50° C., because the gel produced at a temperature above 100° C. tends to crystallize, thus making it difficult to carry out peptization. The alumina gel thus produced is aged if necessary and then washed to remove impurities as a by-product.

In this case, filterability of the alumina gel becomes poor as washing is repeated. It is therefore desirable to wash the alumina gel at first with a weak alkali such as dilute aqueous ammonia or ammonium carbonate solution, and at least with pure water.

The alumina gel after washing is optionally converted to a dispersion liquor or a wet cake having an $Al_2O_3$ content of several to about 70% by weight by the usual filtration or drying. The final form of the alumina gel is properly selected according to the particular object of use.

In practicing the present invention, there are obtained alumina sols having a low viscosity, high $Al_2O_3$ content and high stability with the lapse of time, by subjecting alumina gels, which are produced by neutralizing the water-soluble basic aluminium salt with the alkali, to the hydrothermal treatment in the presence of a monovalent organic acid of such an amount that the molar ratio of the organic acid to aluminium is from 0.001 to 0.15.

As examples of the monovalent organic acid used in the hydrothermal treatment of the present invention, there may be given acetic acid, formic acid and the like. The proportion of the organic acid to $Al_2O_3$ in the alumina gel slurry is from 0.001 to 0.15, preferably from about 0.002 to about 0.1 in the molar ratio of the organic acid to aluminium. The effect of the present invention cannnot be obtained with other types of acids. When the molar ratio of the acid to aluminium is less than 0.001, the peptization becomes difficult, resulting in the lowering of productivity. While, when the ratio is more than 0.15, gelation undesirably takes place during the hydrothermal treatment when the $Al_2O_3$ content is high. This is probably due to the formation of fiber-like alumina particles.

The organic acid may be added to alumina gels before the hydrothermal treatment, or may be added in the course of the production of alumina gels so that a suitable amount of the acid remains even after the washing. The latter method is particularly effective because alumina gels capable of undergoing superior peptization are obtained.

The hydrothermal treatment of the present invention is carried out at a temperature of about 120° C. to about 300° C., preferably at a temperature of about 140° C. to about 200° C., for 0.5 to 7 hours, preferably 2 to 4 hours. When the treatment temperature is below about 120° C., conversion to alumina sols having a high $Al_2O_3$ content becomes difficult, and therefore a long period of time is required for the peptization. While the temperature higher than about 300° C. is undesirable because a rapid-cooling equipment and high-pressure vessel become necessary.

When the hydrothermal treatment is carried out under the above-defined conditions, the alumina gel slurry is gradually peptized, and thus the milk-white slurry turns into a translucent alumina sol having an optional $Al_2O_3$ content of up to about 30%.

The viscosity of the sol obtained by the present hydrothermal treatment is as low as about 60 cps (centipoise, the same applies hereinafter) at 25° C. When the $Al_2O_3$ content is 25% by weight. The viscosity is very stable because it increases only by a few cps even though the sol is allowed to stand for 100 days or more.

By X-ray diffractometry and electron-microscopic observation, it was found that the alumina sol thus obtained consists of alumina particles having a boehmite type crystal lattice and having not a fibrous form but a plate-like to rod-like form of about 0.1 to about $0.02\mu$ in size.

The alumina sol may be used, as it is, in the form of dispersion liquor, or may be dried into alumina powders, for example, by spray drying. The alumina powder thus obtained may be changed into a sol by re-dispersion in water, or may be used as it is.

According to the process of the present invention as described above in detail, it is possible to produce alumina sols which are low in viscosity, high in $Al_2O_3$ content and are extremely superior in stability with the lapse of time, and alumina sols which give alumina powders superior in re-dispersibility, as compared with alumina sols obtained by the well-known processes.

The alumina sols produced by the process of the present invention are particularly useful, for example, as binders, coating agents, surface-modifying agents, polymer-reinforcing agents, carriers for catalysts, cosmetics, medicines, aerosols, paints, curing agents for printing ink, stabilizers and the like.

The process of the present invention will be illustrated in more detail with reference to the following examples, which are not however to be interpreted as limiting the process of the present invention.

EXAMPLE 1

75.3 parts by weight of a 10.9% (by weight) aqueous sodium carbonate solution was added to 100 parts by weight of an aqueous basic aluminium chloride solution (Al content: 4.5% by weight as $Al_2O_3$, OH/Al (equivalent ratio): 0.431) with stirring at 20° C. over 30 minutes to obtain an alumina gel. The alumina gel was aged for 1 hour at 20° C., washed and filtered to obtain 45.8 parts by weight of a wet cake having an $Al_2O_3$ content of 9.64% by weight. This wet cake was dried at 90° C. in an air bath to obtain 8.5 parts by weight of a dry gel having an $Al_2O_3$ content of 51.7% by weight. One part by weight of the dry gel was dispersed in 4.17 parts by weight of water to prepare an alumina gel slurry ($Al_2O_3$ content: 10% by weight). Acetic acid in the amount shown in Table 1 was added to the slurry, and the mixture was subjected to the hydrothermal treatment at 150° C. to 160° C. for 2 hours in a glass autoclave.

The properties of the alumina sols thus obtained are shown in Table 1.

Table 1

| Experiment number | Composition | | | Properties | | | | | | |
|---|---|---|---|---|---|---|---|---|---|---|
| | $Al_2O_3$ weight % | Acid radical/Al* | Appearance | Particle shape** | Stability with the lapse of time (cps)*** | | | | | |
| | | | | | 1 day | 5 days | 10 days | 20 days | 30 days | 3 months |
| 1 | | | | | | | | | | |

Table 1-continued

| Experiment number | Composition | | Properties | | | | | | | |
|---|---|---|---|---|---|---|---|---|---|---|
| | $Al_2O_3$ weight % | Acid radical/Al* | Appearance | Particle shape** | Stability with the lapse of time (cps)*** | | | | | |
| | | | | | 1 day | 5 days | 10 days | 20 days | 30 days | 3 months |
| 1 (Reference example) | 5.8 | 0 | White | Plate | 4.5 | 4.5 | Separation | — | — | — |
| 2 | 10.0 | 0.006 | " | " | 5.3 | 5.3 | 5.3 | 5.5 | 5.7 | 6.5 |
| 3 | 10.0 | 0.01 | " | " | 5.4 | 5.4 | 5.4 | 5.6 | 5.9 | 6.5 |
| 4 | 10.0 | 0.05 | Translucent milk-white | " | 5.0 | 5.0 | 5.0 | 5.2 | 5.7 | 6.0 |
| 5 | 10.0 | 0.1 | Translucent milk-white | Long plate | 5.5 | 5.5 | 5.5 | 5.7 | 6.0 | 6.1 |
| 6 (Reference example) | 10.0 | 0.2 | Translucent milk-white | Fiber | Gelation | — | — | — | — | — |

Note:
*Molar ratio
**Observation on electron-microscopic photograph
***Numerical values in the table show a viscosity.
Separation means the phase separation of alumina (the same applies hereinafter).

It is apparent from the results that alumina sols having a high stability with the lapse of time can be produced at a definite molar ratio of acid radical to aluminium.

REFERENCE EXAMPLE

One hundred parts by weight of an aqueous sodium aluminate solution (Al content: 2.06% by weight as $Al_2O_3$) and 28.4 parts by weight of an aqueous aluminium sulfate solution (Al content: 4.04% by weight as $Al_2O_3$) were mixed with stirring at 20° C. over 30 minutes to obtain an alumina gel slurry.

The produced alumina was aged for 1 hour at 20° C., washed, filtered and dried at 90° C. in an air bath to obtain 5.3 parts by weight of a dry gel having an $Al_2O_3$ content of 59.5% by weight. The dry gel was then subjected to the hydrothermal treatment under the same conditions as in Experiment No. 4 of Example 1.

As a result, the dry gel was peptized by only 10% by weight, which means that the gel was not substantially converted to alumina sol.

EXAMPLE 2

One hundred parts by weight of the dry gel obtained by the same manner as in Example 1 was dispersed in 417 parts by weight of a 0.56% (by weight) aqueous formic acid solution to prepare an alumina gel slurry (Al content: 10% by weight as $Al_2O_3$, acid radical/Al (molar ratio): 0.05). This slurry was subjected to the hydrothermal treatment at 150° C. to 160° C. for 2 hours in a glass autoclave.

The properties of the alumina sol thus obtained are shown in Table 2.

Table 2

| Composition | | Properties | | | | | |
|---|---|---|---|---|---|---|---|
| Acid radical/Al | $Al_2O_3$ weight % | Appearance | Particle shape | Stability with the lapse of time (cps) | | | |
| | | | | 1 day | 5 days | 30 days | 3 months |
| 0.05 | 10.2 | Translucent milk-white | Plate | 5 | 5 | 5.6 | 6.5 |

EXAMPLE 3

72.8 parts by weight of an aqueous ammonium carbonate solution having an $NH_3$ content of 3.5% by weight was added to 100 parts by weight of an aqueous basic aluminium nitrate solution (Al content: 4.5% by weight as $Al_2O_3$, OH/Al (equivalent ratio): 0.45) with stirring at 20° C. over 30 minutes to obtain an alumina gel. The produced alumina gel was aged for 1 hour at 20° C., washed and filtered to obtain 46.5 parts by weight of a wet cake having an $Al_2O_3$ content of 9.5% by weight. This wet cake was dried at 90° C. in an air bath to obtain 8.4 parts by weight of a dry gel having an $Al_2O_3$ content of 52% by weight.

One part of weight of the dry gel was dispersed in 2.46 parts by weight of water to prepare an alumina gel slurry ($Al_2O_3$ content: 15% by weight). Acetic acid in the amount shown in Experiment No. 4 in Table 1 was added to the slurry, and the mixture was subjected to the hydrothermal treatment at 150° C. to 160° C. for 2 hours in a glass autoclave.

The properties of the alumina sol thus obtained are shown in Table 3.

Table 3

| Composition | | Properties | | | | | |
|---|---|---|---|---|---|---|---|
| Acid radical/Al | $Al_2O_3$ weight % | Appearance | Particle shape | Stability with the lapse of time (cps) | | | |
| | | | | 1 day | 5 days | 30 days | 3 months |
| 0.05 | 15 | Translucent milk-white | Plate | 20 | 20 | 22 | 28 |

EXAMPLE 4

One hundred parts by weight of the dry gel obtained by the same manner as in Example 3 was dispersed in 108 parts by weight in water to prepare an alumina gel slurry ($Al_2O_3$ content: 25% by weight). Acetic acid of the amount shown in Table 4 was added to the slurry, and the mixture was subjected to the hydrothermal treatment at 150° C. to 160° C. for 2 hours in a glass autoclave. The properties of the alumina sol thus obtained are shown in Table 4.

Table 4

| Composition | | Properties | | | | | |
|---|---|---|---|---|---|---|---|
| Acid radical/ Al | Al$_2$O$_3$ weight % | Appearance | Particle shape | Stability with the lapse of time (cps) | | | |
| | | | | 1 day | 5 days | 30 days | 3 months |
| 0.003 | 22.8 | Translucent milk-white | Plate | 55 | 55 | 60 | 78 |

EXAMPLE 5

0.533 part by weight of a 99% (by weight) acetic acid was added to 100 parts by weight of an aqueous basic aluminium chloride solution (Al content: 4.5% by weight as Al$_2$O$_3$, OH/Al (equivalent ratio): 0.431). The mixture was aged at 50° C. for 30 minutes and then cooled to 30° C. Thereafter, 75.3 parts by weight of a 10.9% (by weight) aqueous sodium carbonate solution was added to the mixture with stirring over 30 minutes to obtain an alumina gel. The temperature was maintained at 25° C. to 30° C. while the alumina gel was formed. The produced alumina gel was aged for 1 hour, washed and filtered to obtain 45.1 parts by weight of a wet cake having an Al$_2$O$_3$ content of 9.8% by weight. This wet cake was dried at 90° C. in an air bath to obtain 8.3 parts by weight of a dry gel having an Al$_2$O$_3$ content of 53.1% by weight. One part by weight of the dry gel was dispersed in 4.31 parts by weight of water (Al$_2$O$_3$ content: 10% by weight), and subjected to the hydrothermal treatment at 150° C. to 160° C. for 2 hours in a glass autoclave.

The properties of the alumina sol thus obtained are shown in Table 5.

Table 5

| Composition | | Properties | | | | | |
|---|---|---|---|---|---|---|---|
| Acid radical/ Al | Al$_2$O$_3$ weight % | Appearance | Particle shape | Stability with the lapse of time (cps) | | | |
| | | | | 1 day | 5 days | 30 days | 3 months |
| 0.04 | 10.3 | Translucent milk-white | Plate | 5 | 5 | 5.1 | 5.5 |

EXAMPLE 6

The alumina sol obtained by the same manner as in Examples 1–4 was spray-dried to obtain an alumina powder during which the gas temperatures at the inlet and outlet were maintained at 150° C. and 50° C., respectively. The properties of the alumina powder obtained were as follows:

| Al$_2$O$_3$ content | 66.6% by weight |
|---|---|
| Shape | Sphere |
| Mean particle size | 20μ |

One hundred parts by weight of the alumina powder was added to 344 parts by weight of water and re-dispersed at 15° C. for 5 minutes with stirring (Al$_2$O$_3$ content: 15% by weight). The properties of the alumina sol thus obtained are shown in Table 6.

For comparison, the commercially available dispersible alumina powder was re-dispersed in the same manner as above to obtain an alumina sol. This result is shown together in Table 6.

Table 6

| | Al$_2$O$_3$ (wt. %) | Dispersion rate (%) | Appearance of product | Particle shape | Stability with the lapse of time (cps) | | | |
|---|---|---|---|---|---|---|---|---|
| | | | | | 1 day | 5 days | 30 days | 3 months |
| Present product | 14.9 | 99.8 | Translucent milk-white | Plate | 5 | 5 | 5.2 | 5.8 |
| Commercial product | 12.8 | 85 | White | Plate | 70 | Gelation | | |

It is apparent from Table 6 that the present product is superior to the commercial one in the dispersion rate, and is extremely superior in the sol stability with the lapse of time.

What is claimed is:

1. A process for producing an alumina sol which comprises neutralizing a water-soluble basic aluminium salt of the formula, $$Al_2(OH)_xX_yY_z$$

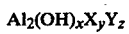

wherein X is Cl or NO$_3$, Y is SO$_4$, and x, y and z are numbers satisfying the equations $x+y+2z=6$, $0<x<6$, $0 \leq y<6$, $0 \leq 2z<6$, provided that y and z are not zero at the same time, with an alkali to produce an alumina gel and then subjecting said alumina gel to a hydrothermal treatment in the presence of a monovalent organic acid at a molar ratio of the organic acid to aluminum of from 0.001 to 0.15 to produce an alumina sol containing alumina particles of a plate-like or rod-like form.

2. A process according to claim 1, wherein said water-soluble basic aluminium salt is basic aluminium chloride.

3. A process according to claim 1, wherein neutralization of said water-soluble basic aluminium salt with the alkali is carried out at about 15° C. to about 50° C.

4. A process according to claim 1, wherein said molar ratio of the organic acid to aluminium is from 0.002 to 0.1.

5. A process according to claim 1, wherein said hydrothermal treatment is carried out at about 120° C. to about 300° C.

6. A process according to claim 5, wherein the hydrothermal treatment is carried out at about 140° C. to about 200° C.

7. A process according to claim 1, wherein said monovalent organic acid is acetic acid.

* * * * *